Oct. 15, 1968    R. N. CLOSE ET AL    3,406,392
AUTOMATIC ERROR CORRECTING SYSTEM
Filed Feb. 15, 1955
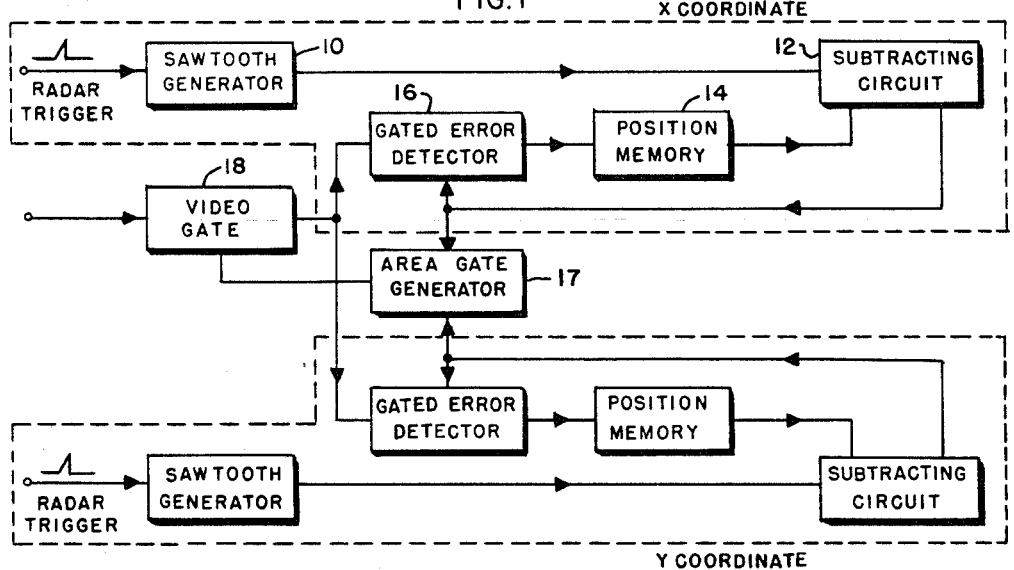
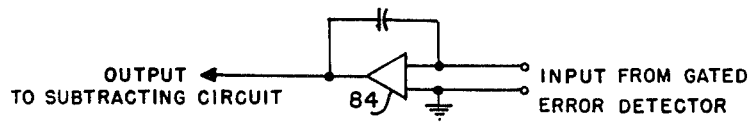
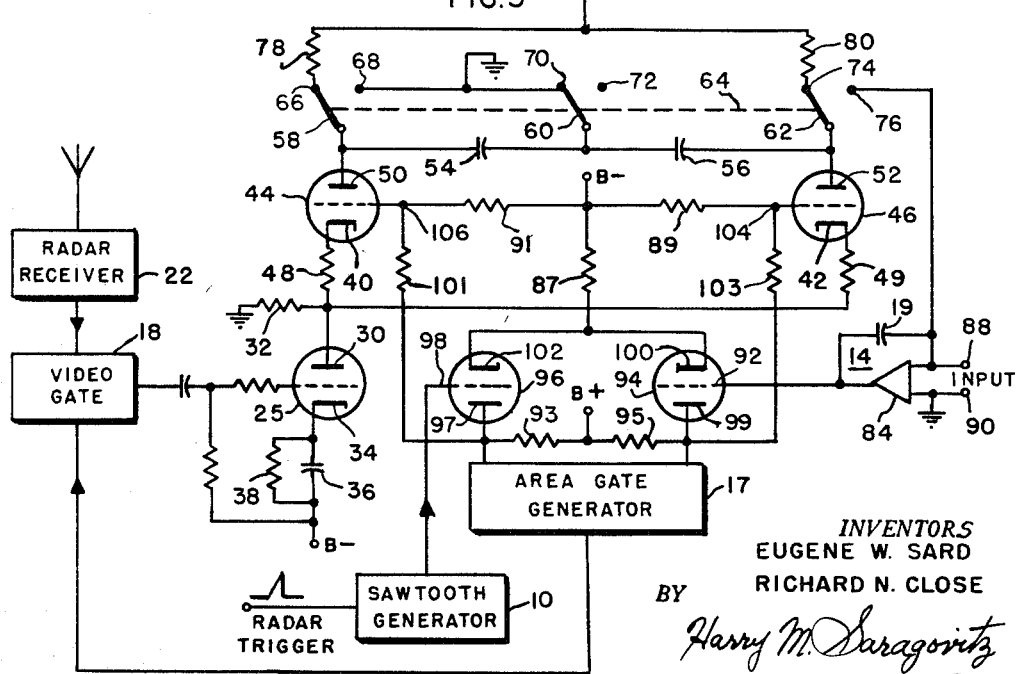
INVENTORS
EUGENE W. SARD
RICHARD N. CLOSE
BY
Harry M. Saragovitz
ATTORNEY

United States Patent Office 3,406,392
Patented Oct. 15, 1968

3,406,392
AUTOMATIC ERROR CORRECTING SYSTEM
Richard N. Close, Garden City, and Eugene W. Sard, Flushing, N.Y., assignors to the United States of America as represented by the Secretary of the Army
Filed Feb. 15, 1955, Ser. No. 488,734
8 Claims. (Cl. 343—7.3)

This invention relates to a track-while-scan radar system and more particularly to a system for automatically correcting the error between the actual position of a target and the predicted position indicated in a position memory circuit.

In track-while-scan radar systems, position memory circuits or cells which include a storage capacitor are usually utilized to store the predicted position of a target with respect to a reference position by means of voltage analogs. The predicted target position voltage analogs are stored in rectangular coordinates with reference to a pair of axes, usually referred to as the X and Y axes, that run north-to-south and east-to-west. For accurate target tracking, the values of the stored rectangular coordinates should be identical with the position coordinates of the persistent target image appearing upon a suitable indicator immediately after the sweep line has gone by, i.e., immediately after the radar beam has passed the target. To properly align the actual measured target position with the stored predicted target position, it is necessary to provide a system for automatically correcting the error between the two positions, each measured, for example, in rectangular coordinates, one coordinate being the distance from the X axis and representing the Y component, the other being distance from the Y axis and representing the X component. In previous techniques, unidirectional devices such as diodes or gas tubes with their concomitant undesirable backlash characteristics were utilized to disconnect the position memory circuit from the error signal source during the time the error signals were integrated.

It is therefore an object of the present invention to provide an improved system for automatically correcting the error between the actual measured position of a target and the predicted target position stored in the position memory circuit.

It is another object of the present invention to provide an error correcting system for use in track-while-scan systems wherein the need for gas tube or diode disconnect means is completely eliminated.

In accordance with the present invention the system for automatically correcting the error in the predicted target position includes means for converting the time of arrival of the echo returns to voltage signals having amplitudes proportional to the distance from a zero position and a pair of discrete integrating circuits, each including a capacitor and having a long time constant with respect to the time for the radar beam to pass over the target but a short time constant with respect to the time for one revolution of the radar beam sweep. Also included are discrete charging and discharging means in circuit with each of the integrating circuits and adapted to charge the integrating capacitors to an initial potential between each revolution of the radar beam and to discharge the integrating capacitors for the time the radar beam passes over a target. Included further are means in circuit with each of the charging and discharging circuits and responsive to the difference in the values of the converted voltage signals and the stored signal, and means for gating the charging and discharging circuits only for the duration of a selected target whereby the respective integrating capacitors are charged to discrete potentials which are in the proportion determined by the relative values of the converted voltage signal corresponding to the selected target and the stored signal. The difference in charge on the integrating capacitors from their respective charging and discharging circuits and simultaneously connecting them in series in circuit with the position memory storage capacitor whereby the difference in charge between the integration capacitors flows into the storage capacitor in a direction such that the error between the actual target position and the position indicated by the storage capacitor is reduced.

For a better understanding of the invention, together with other and further objects thereof, reference is had to the following description taken in connection with the accompanying drawing in which:

FIGURE 1 is a block diagram showing the present invention as utilized with both the X and Y coordinates;

FIGURE 2 illustrates a typical position memory cell; and

FIGURE 3 is a simplified schematic diagram of the present invention.

Inasmuch as the invention is applicable to both the X and Y coordinates, only one of the systems shown within the closed lines, representing the X coordinate, will be described, it being understood that both systems are identical. Referring now to FIGURE 1 of the drawing, at 10 there is shown a sawtooth voltage generator which is controlled by the radar trigger and the azimuth synchronized signals which indicate the azimuth angle to provide a linear sawtooth voltage representing either the X or Y component of a radial sweep in the direction in which the radar is pointing, the zero or reference azimuth being the X axis. Sawtooth generator 10 converts the time of arrival of a radar return pulse into a voltage that is proportional to distance. This is accomplished by having the potential of the sawtooth output voltage start at zero, i.e., the location of the radar, and rise at a rate scaled to half the speed of light times the cosine (or sine) of the azimuth angle so that at any instant the sawtooth potential represents the distance from the X (or Y) axis to an object whose echo is then being received by the radar receiver. The output of sawtooth generator 10 is applied to a subtracting circuit 12, essentially a symmetrical differential amplifier, where it is compared with the output from position memory circuit or cell 14, shown in detail in FIGURE 2, which provides a direct-current potential representing the stored coordinate voltage for the target being tracked. The difference signal from subtracting circuit 12 is fed to a gated error detector circuit 16 which utilizes capacitors to integrate the error signal for the duration of a preselected target. A gating signal is applied from subtracting circuit 12 through an area gate generator to the video gate 18 for video gating by any suitable selective means. For example, area gate generator 17 may comprise a coincidence circuit that passes a signal whenever the X and Y differences are small at the same time. Thus as the sweep line progresses, the X sawtooth may pass the potential of the X memory as many times as the Y sawtooth may pass the Y memory potential. However, only when the X sawtooth passes the X potential at the same time that the Y sawtooth passes the Y potential does it mean that the sweep voltage is passing near the target position. This area gate signal therefore permits the passing only of the video that is near the predicted location of the target, so that the error detector circuit is operative only for the duration of the radar scan across the preselected target. The output of the gated error detector circuit 16 is a function of the sum total of the effect of all the pulse differences which have occurred as the radar beam passes over the preselected target and is applied to the storage capacitor in position memory circuit 14 in a manner to correct the error between the actual target position and the stored target position.

The detailed schematic diagram of the system shown in FIGURE 1 is illustrated in FIGURE 3. Referring now to FIGURE 3, at 22 there is shown a radar receiver, the output of which is coupled to the control grid of video gate 18. As hereinabove described, a selector circuit comprising the output of area gate 17 is provided so that only the video output corresponding to a particular target may be applied from video gate 18 to driver tube 25. Inasmuch as such selector circuits are well known in the art, no further description thereof is believed necessary. Anode 30 of driver tube 25 is connected to ground through resistor 32 and cathode 34 is connected to B— through the parallel arrangement of capacitor 36 and resistor 38. Anode 30 is also connected to the respective cathodes 40 and 42 of error detector tubes 44 and 46 through resistors 48 and 49, respectively. Connected between the respective anodes 50 and 52 of tubes 44 and 46 is a pair of capacitors 54 and 56. Anodes 50, 52 and the junction between capacitors 54 and 56 are respectively connected to discrete ganged contact arms 58, 60 and 62 of a relay 64 which may be energized by any suitable means well known in the art. Relay 64 is provided with three discrete pairs of contact terminals 66–68, 70–72 and 74–76, which are operatively associated respectively with each of the contact arms 58, 60 and 62. As shown, relay terminals 66 and 74 are connected to B+ through resistors 78 and 80, respectively, terminals 68 and 70 have a common connection to ground, terminal 76 is connected to the input circuit of position memory circuit 14 and terminal 72 is open. Position memory circuit 14 consists of a direct-current amplifier 84 with a differential input stage and a storage capacitor 19 connected from the output end of amplifier 84 to one of the input ends of the differential input stage, with the input side of the storage capacitor 19 being very close to ground. A small difference in potential between the input terminals 88 and 90 will be amplified to a large signal at the output. The polarity of coupling through capacitor 19 is such that a potential difference at the input will cause an output which, when fed back, will tend to reduce the input potential difference. Since the input side of storage capacitor 19 is close to ground, any charge left thereon will therefore result in a voltage at the amplifier output nearly equal to the voltage across the capacitor 19. Such circuits are so well known in the art that no detailed description thereof is believed to be necessary. The output of storage capacitor 19 is fed to one grid input 92 of a symmetrical differential amplifier or subtracting circuit comprising vacuum tubes 94 and 96, while the output of sawtooth generator 10 is applied to the other grid input 98 of the differential amplifier. The respective anodes of tubes 94 and 96 are connected to a B+ source through resistors 93 and 95 while the respective cathodes 100 and 102 are connected to B— through common cathode resistor 87. As shown, anode 97 is connected to grid 106 of error detector tube 44 through level-shifting resistors 101 and 91 and anode 99 is connected to grid 104 of error detector tube 46 through level-shifting resistors 103 and 89. As hereinabove stated, the sawtooth potential is arranged to start from zero, and rises at a rate scaled to half the speed of light times the appropriate trigonometric function of the azimuth angle so that at any instant the potential represents the distance from the X or Y axis in whichever coordinate channel the particular circuit operates, to an object whose echo is then being received by the radar receiver.

In considering the operation of the circuit of FIGURE 3, it is to be assumed that a particular target has been selected to be tracked; that the analog voltage of the position from one coordinate of the target has been stored in storage capacitor 19; and that storage capacitor 19 is adapted to store the summation of all pulse echo returns from the selected target as the radar beam passes over the target so that the value of the stored signal is proportional to the distance of the target from a zero position, i.e., the X or Y axis with the origin at the location of the radar. A number of radar returns must be summed because, as the radar rotates, the first returns are in error because they are early in azimuth and subsequent returns are in error because they are late in azimuth. The summation of all returns, however, should be correct. It is to be further assumed that relay 64 is unenergized and that the contact arms 58, 60, and 62 are in the position shown in FIGURE 3. Thus, capacitor 56 is connected in the anode-cathode circuit of tube 46 while capacitor 54 is connected in the anode-cathode circuit of tube 44, the junction between the capacitors being connected to ground through arm 60 and terminal 70. The resistor-capacitor combination values in each anode circuit are so chosen that the time constant is short compared with the time of one revolution of the radar antenna but long compared with the time for the radar beam to pass over the target. With no output from receiver 22, both the tubes 44 and 46 are non-conductive so that capacitors 54 and 56 are both substantially charged to B+ supply voltage, through resistors 78 and 80 respectively. When the target to be tracked is allowed to pass through receiver 22 and gate 18, the output of driver 25 will trigger tubes 44 and 46 into conduction.

Now, if the echo is received from a target whose coordinate distance is correctly stored, the sawtooth voltage will be exactly the same as the predicted stored coordinate position voltage and thus grids 104 and 106 of tubes 46 and 44 will be at the same potential, thus causing the two tubes to equally share the current under influence of the echo video signal from gate 18. If, however, the storage capacitor 19 of the coordinate position memory circuit is not storing the correct potential, then tubes 44 and 46 will not share the current equally. When the first echo pulses arrive at the radar, the two tubes 44 and 46 draw some current from integrating capacitors 54 and 56, i.e., these capacitors are discharged, in the proportion determined by the relative values of the sawtooth voltage and the stored signal voltage. However, because of the time constants involved, the potential on the integrating capacitors does not change very much before another video pulse arrives causing the capacitors to be discharged still further so that the errors for successive radar pulses are integrated for the duration of the target. By this time, the integration capacitors 54 and 56 will have been discharged to a considerable extent and the difference in charge therebetween will be determined by the sum total of the effect of the pulse differences which have occurred. At this point, the relay is now energized by any suitable means, and, as a result, arm 58 makes contact with terminal 68, arm 60 makes contact with open terminal 72, and arm 62 makes contact with terminal 76. By this arrangement capacitors 54 and 56 are disconnected from their charging and discharging circuits and are simultaneously connected effectively in series between the input of the position memory circuit 14 and ground. The difference in charge between the two capacitors is therefore allowed to flow into the storage capacitor 19 to change its potential in a direction that reduces the error between the measured echo position and the coordinate position stored in the memory circuit. At this point, the relay is again de-energized by any suitable means and, due to the short time constant of the RC integrating circuits compared with the time of one revolution of the antenna, the capacitors 54 and 56 will again be charged to B+ when the radar beam rotates around to the target again and the procedure is again repeated.

While there have been described what are at present considered to be the preferred embodiments of this invention, it will be obvious to those skilled in the art that various changes and modifications may be made therein without departing from the invention. For example, as described here, the error correction is made in each of two rectangular coordinates thereby providing two-dimensional position data for a selected target. The invention is equally applicable to error correction in range. As another example, the invention is also applicable for making corrections to a rectangular coordinate velocity memory where the correction made is proportional to the measured position error in the rectangular coordinate. It is, therefore, aimed in the appended claims to cover all such changes and modifications as fall within the true spirit and scope of the invention.

What is claimed is:

1. In a track-while-scan radar system, means for correcting the error between the actual position of selected target and the predicted target position indicated by a potential on a storage capacitor adapted to store the summation of all pulse echo returns from the selected target as the radar beam passes over the target, the value of the stored signal being substantially proportional to the coordinate distance of said target from a reference position, comprising means for converting the time of arrival of the echo return to a voltage signal having a value proportional to the coordinate distance from said reference position, a pair of discrete integrating circuits each including a capacitor, and each having a long time constant with respect to the time for the radar beam to pass over said target, means in circuit with each of said integrating circuits and responsive to the difference in the values of said voltage signal and said stored signal whereby the respective integrating circuit capacitors are charged to discrete potentials which are in the proportion determined by the relative values of said converted voltage signal and said stored signal, the difference in charge on the integrating circuit capacitors being determined by the sum total of the effect of all the pulse differences which have occurred as the radar beam passes over the selected target, and means for simultaneously disconnecting said integrating circuit capacitors from their respective integrating circuits and connecting said capacitors in circuit with said storage capacitor whereby the difference in charge between said capacitors flows into said storage capacitor in a direction to correct said storage capacitor potential such that the error between the actual target position and the predicted position is reduced.

2. In a track-while-scan radar system, means for correcting the error between the actual position of a selected target and the predicted target position indicated by a potential on a storage capacitor adapted to store the summations of all pulse echo returns from said target as the radar beam passes over the target, the value of the stored signal being substantially proportional to the coordinate distance of said target from a reference position, comprising means for converting the time of arrival of the target echo return to a voltage signal having a value proportional to the coordinate distance from said reference position, a pair of RC integrating circuits each having a long time constant with respect to the time for the radar beam to pass over said target, means in circuit with each of said RC circuits and responsive to the difference in values between said stored signal and said converted voltage signal whereby the respective capacitors in each RC integrating circuit are charged to discrete potentials which are in the proportion determined by the relative values of said voltage signal and said stored signal, the difference in charge on the capacitors being determined by the sum total of the effect of all the pulse differences which have occurred as the radar beam passes over the selected target, and means for simultaneously disconnecting said capacitors from their respective RC circuits and connecting said capacitors serially in circuit with said storage capacitor whereby the difference in charge between said capacitors flows into said storage capacitor in a direction to correct said storage capacitor potential such that the error between the actual target position and the predicted position indicated by said storage capacitor is reduced.

3. In a track-while-scan radar system, means for correcting the error between the actual position of a selected target and the predicted target position indicated by a potential on a storage capacitor adapted to store the summations of all pulse echo returns from said target as the radar beam passes over the target, the value of the stored signal being substantially proportional to the coordinate distance of the target from a reference position, comprising means for converting the time of arrival of the echo return to a voltage signal having a value proportional to the coordinate distance from said reference position, a pair of discrete integrating circuits each including a capacitor and each having a long time constant with respect to the time for the radar beam to pass said target, a symmetrical differential amplifier responsive to the difference in values of said voltage signal and said stored signal and having two discrete outputs connected respectively to each of said integrating circuits such that the respective capacitors are charged to potentials which are in the proportion determined by the relative values of said voltage signal and said stored signal, the difference in charge on the capacitors being determined by the sum total effect of all the pulse differences which have occurred as the radar beam passes over the target, and means for simultaneously disconnecting said capacitors from their respective integrating circuits and connecting said capacitors serially in circuit with said storage capacitor whereby the difference in charge between said capacitors flows into said storage capacitor in a direction to correct said storage capacitor potential such that the error between the actual target position and the predicted position indicated in said storage capacitor is reduced.

4. In a track-while-scan radar system, means for correcting the error between the actual position of a selected target and the predicted target position indicated by a potential on a storage capacitor adapted to store the summation of all pulse echo returns from the selected target as the radar beam passes over the target, the value of the stored signal being substantially proportional to the coordinate distance said target is from a reference position, comprising means for converting the time of arrival of the echo returns to corresponding voltage signals having values proportional to the coordinate distance from said reference position, a pair of discrete integrating circuits each including a capacitor and each having a long time constant with respect to the time the radar beam passes over the target and a short time constant with respect to the time for one revolution of the radar beam sweep, discrete charging and discharging means in circuit with each of said integrating circuits and adapted to charge the integrating circuit capacitors to an initial potential between each revolution of said beam and to discharge the integrating circuit capacitors for the time said beam passes over a target, means in circuit with each of said charge and discharge circuits and responsive to the difference in the values of said voltage signals and said stored signal, means for gating said charging and discharging circuits only for the duration of said selected target whereby the respective integrating circuit capacitors are charged to discrete potentials which are in the proportion determined by the relative values of the voltage signal corresponding to the selected target and said stored signal, the difference in charge being determined by the sum total of the effect of all the pulse differences which occurred as the radar beam passes over said selected target, and switch means for simultaneously disconnecting said capacitors from their respective integrating circuits and from their respective charging and discharging circuits and connecting said capacitors serially with said storage capacitor whereby the difference in charge between said integrating capacitors reduces the error between said actual position and the predicted position indicated in said storage capacitor.

5. In a track-while-scan radar system, means for correcting the error between the actual position of a selected target and the predicted target position indicated by a potential on a storage capacitor adapted to store the summation of all pulse echo returns from the selected target as the radar beam passes over the target, the value of the stored signal being substantially proportional to the coordinate distance said target is from a reference position comprising means for converting the time of arrival of the echo returns to corresponding voltage signals having values proportional to the coordinate distance from said reference position, a pair of RC integrating circuits each having a long time constant with respect to the time the radar beam passes over a target and a short time constant with respect to the time for one revolution of the radar beam sweep, discrete charging and discharging means in circuit with each of said integrating circuits and adapted to charge the integrating capacitors to an initial potential between each revolution of said beam and to discharge said integrating capacitors for the time said beam passes over a target, a symmetrical differential amplifier having discrete outputs respectively in circuit with each of said charging and discharging means and responsive to the difference between said voltage signals and said stored signals, means for gating said charging and discharging circuits only for the duration of said selected target whereby the respective integrating capacitors are charged to discrete potentials which are in the proportion determined by the relative values of the voltage signal corresponding to the selected target and said stored signal, the difference in charge being determined by the sum total of the effect of all the pulse differences which have occurred as the radar beam passes over said selected target, and means including a relay for simultaneously disconnecting said integrating capacitors from their respective integrating circuits and from their respective charging and discharging circuits and connecting said capacitors serially with said storage capacitor whereby the difference in charge between said integrating capacitors reduces the error between said actual position and the predicted position indicated in said storage capacitor.

6. In a track-while-scan radar system having a receiver and a storage capacitor adapted to store the summation of all pulse echo returns from a given target as the radar beam passes over a target such that the value of the stored signal is substantially proportional to the coordinate distance of said target from a reference position, means for automatically correcting the error between a given target position predicted by said stored signal and the actual position of said target comprising, means for generating a linear sawtooth voltage having a slope such that at any instant the potential represents the coordinate distance to a target whose echo is being received, a pair of discrete integrating circuits each including a capacitor and each having a short time constant with respect to one revolution of the radar beam sweep and a long time constant with respect to the time for the radar beam to pass over the target, means in circuit with each of said integrating circuits for charging the capacitors therein to an initial potential between each revolution of said beam and for discharging said integrating circuit capacitors for the time said beam passes over a target, a symmetrical differential amplifier having its respective outputs in circuit with each of said charging and discharging means and having its input responsive to the outputs of said stored signal and said sawtooth voltage, means in circuit with the output of said receiver and said charging and discharging means for gating said charging and discharging means for the duration of the given target when said sawtooth voltage is at a potential proportional to the actual position of said given target whereby said capacitors integrate the error signal between said stored signal and said sawtooth voltage for the duration of the given target, the difference in charge in the capacitors being determined by the sum total of the effect of all the pulse differences which have occurred as the radar beam passes over the given target, and means for simultaneously disconnecting said capacitors from their respective integrating circuits and charge and discharge circuits and connecting said integrating capacitors serially with said storage capacitor whereby the difference in charge between said integrating circuit capacitor reduces the error between the actual position of the given target and the indicated predicted position thereof in said storage capacitor.

7. The device in accordance with claim 6 wherein said integrating circuits comprise RC circuits.

8. In a track-while-scan radar system having a receiver and a storage capacitor adapted to store the summation of all pulse echo returns from a given target as the radar beam passes over the target such that the value of the stored signal is substantially proportional to the coordinate distance of said target from a reference position, means for automatically correcting the error between the predicted position indicated by said stored signal and the actual position of said target comprising, means for generating a linear sawtooth voltage having a slope such that at any instant the potential represents the coordinate distance to a target whose echo is being received, a pair of RC integrating circuits each having a long time constant with respect to the time the radar passes over a target and a short time constant with respect to the time for one revolution of the radar beam sweep, discrete charging and discharging means in circuit with each of said integrating circuits and adapted to charge the integrating capacitors to an initial potential between each revolution of said radar beam and to discharge said integrating capacitors for the duration said radar beam passes over a target, a symmetrical differential amplifier having discrete outputs respectively in circuit with each of said charging and discharging means and responsive to the difference between said voltage signals and said stored signal, means in circuit with the output of said receiver and said charging and discharging means for gating said charging and discharging means for the duration of the given target when said sawtooth voltage is at a potential proportional to the actual position of said given target whereby said capacitors integrate the error signal between said stored signal and said sawtooth voltage for the duration of the given target, the difference in charge in the capacitors being determined by the sum total of the effect of all the pulse differences which have occurred as the radar beam passes over the given target, and means for simultaneously disconnecting said capacitors from their respective integrating circuits and charge and discharge circuits and connecting said integrating capacitors serially with said storage capacitor whereby the difference in charge between said integrating capacitors reduces the error between the actual position of the given target and the indicated predicted position thereof in said storage capacitor.

References Cited

UNITED STATES PATENTS

| | | | |
|---|---|---|---|
| 2,491,029 | 12/1949 | Brunn | 343—7.3 |
| 2,516,356 | 1/1950 | Tull et al. | 343—7.3 |
| 3,209,133 | 9/1965 | Downs | 343—7.3 X |

RODNEY D. BENNETT, *Primary Examiner.*

T. H. TUBBESING, *Assistant Examiner.*